(12) United States Patent
Barbour et al.

(10) Patent No.: US 7,519,438 B2
(45) Date of Patent: Apr. 14, 2009

(54) METHOD AND A TOOL FOR CALCULATING AND DISPLAYING FAULT RESPONSE TOLERANCES FOR A POWER SWITCHING DEVICE

(75) Inventors: Erskine R. Barbour, Benson, NC (US); Varagur R. Ramanan, Cary, NC (US)

(73) Assignee: ABB Technology AG, Zurich (CH)

( * ) Notice: Subject to any disclaimer, the term of this patent is extended or adjusted under 35 U.S.C. 154(b) by 498 days.

(21) Appl. No.: 11/269,925

(22) Filed: Nov. 9, 2005

(65) Prior Publication Data

US 2007/0165340 A1 Jul. 19, 2007

(51) Int. Cl.
*G05B 11/01* (2006.01)
*G01R 31/00* (2006.01)

(52) U.S. Cl. .................. 700/22; 700/286; 700/291; 702/58; 705/412; 345/418

(58) Field of Classification Search ............ 700/22, 700/286, 291; 702/57, 59, 58; 705/412; 345/418; 715/700, 733, 734, 736, 762
See application file for complete search history.

(56) References Cited

U.S. PATENT DOCUMENTS

| | | | | |
|---|---|---|---|---|
| 4,803,592 | A * | 2/1989 | Ashley ..................... | 361/79 |
| 5,953,536 | A * | 9/1999 | Nowlin, Jr. ............... | 713/323 |
| 6,571,153 | B1 * | 5/2003 | Maeda et al. .............. | 700/292 |
| 6,653,821 | B2 * | 11/2003 | Kern et al. ................ | 322/7 |
| 2004/0095237 | A1 * | 5/2004 | Chen et al. ............... | 340/506 |
| 2004/0236620 | A1 * | 11/2004 | Chauhan et al. ........... | 705/9 |
| 2005/0018371 | A1 * | 1/2005 | Mladenik et al. .......... | 361/78 |
| 2005/0033481 | A1 * | 2/2005 | Budhraja et al. ........... | 700/286 |
| 2005/0267642 | A1 * | 12/2005 | Whiffen et al. ............ | 700/286 |
| 2006/0126608 | A1 * | 6/2006 | Pereira et al. .............. | 370/360 |

FOREIGN PATENT DOCUMENTS

| | | |
|---|---|---|
| EP | 0828329 | 3/1998 |
| WO | WO 2005/043712 | 5/2005 |

OTHER PUBLICATIONS

Cardinal P G, "Automated Coordination Programs Do Not Make Correct Results Automatic," IEEE, May 6, 1996, p. 97-102.
Toth et al., "Enhanced Sectionalizing through Proper Testing of Recloser Time Current Curves" IEE, Apr. 24, 1994, p. B5-1.

* cited by examiner

*Primary Examiner*—Kamini S Shah
*Assistant Examiner*—Sheela Rao
(74) *Attorney, Agent, or Firm*—Micahel C. Prewitt; Bryan A. Shang

(57) ABSTRACT

A method and tool for an integrated power switching device configuration tool and fault response tolerance calculator determines the fault response tolerance characteristics of a power switching device, adjusts the predicted fault responses based on the fault response tolerances and displays the adjusted fault response results. The fault response tolerance calculation tool uses configuration information defined during the configuring of the power switching device and applies this information to an over current response curve selected by a user. The tool calculates the different fault response tolerances and adjusts predicted response times accordingly. The adjusted fault responses are displayed to the user along with a range of recommended fault response values.

5 Claims, 8 Drawing Sheets

METHOD AND A TOOL FOR CALCULATING AND DISPLAYING FAULT RESPONSE TOLERANCES FOR A POWER SWITCHING DEVICE

FIELD OF THE INVENTION

The present invention relates to a power switching device and more particularly to a user interface used to calculate and display overcurrent response tolerances for a power switching device.

BACKGROUND OF THE INVENTION

In the power generation and distribution industry, utility companies generate and distribute electricity to their customers. To facilitate the process of distributing electricity, various types of power switching devices are used. In a distribution circuit, electricity flows through the power switching devices from a power generation source (typically a substation or the like) to the consumer. When a fault is detected in the distribution circuit, the power switching device is opened and the electrical connection is broken.

Controllers are used by the utility company to detect faults that occur in the distribution circuit. Controllers typically use a microprocessor or microcontroller programmed to respond to the fault based on the type of fault, the type of power switching device connected to the controller, and the location of the fault. The controller may respond to a particular fault by causing the power switching device to remain open. Alternatively, upon detection of a fault, the controller may cause the power switching device to open and close multiple times.

Faults typically occur when excess amounts of electrical current are conducted through the distribution circuit. The controller is programmed to detect when fault conditions occur and respond with a preprogrammed response. The distribution circuit generally has several power switching devices connected in series, cascaded from a substation to the consumer. When a fault occurs in the distribution circuit, it is important that the controller closest to the fault isolate the fault. This allows the least number of customers to be affected by the fault.

Utility companies typically coordinate the responses of the power switching devices to isolate any faults with minimal service interruption. To accomplish this, the responses of the cascaded power switching devices are coordinated so the controller closest to the fault detects the fault condition and causes its associated power switching device to open. When the power switching device opens, the flow of electricity is interrupted.

A power switching device may have a delay in responding to a fault condition. Therefore, in programming the response of cascaded power switching devices to a fault condition, the utility company should take into account the response delay of each power switching device in the cascade. Taking that delay into account will give the controller closest to the fault enough time to analyze and detect the fault condition and cause its associated power switching device to respond before a controller at a higher level in the cascaded network responds to the fault.

As is common in the industry, utility company personnel use overcurrent response curves (also referred to as protection curves) to predict the amount of time it takes for a power switching device to open after a fault condition is detected. To configure the cascading power switching devices, the response times of the power switching devices must be accurately modeled. Part of the modeling process requires that an estimated range of response times be taken into account. A fault response tolerance is a value that is added to or subtracted from the predicted fault response time to allow for any deviation in the actual response time. Typically, utility companies provide guidelines to their employees outlining how to calculate the fault response tolerances for the power switching devices. For example, one utility may determine that the measured value of fault current may deviate by a predetermined percentage. Using the overcurrent response curves and plotting the range of values for the fault current, the utility company personnel can predict the fault response tolerances based on this range. The power switching devices are then configured based on the fault response tolerance results.

One drawback with existing configuration tools used to program the power switching devices is the lack of an automated fault response tolerance calculation tool. Utility company personnel currently utilize a manual method of calculating overcurrent response tolerances when configuring the power switching devices. This process is time consuming and subject to human error.

One alternative to the manual calculation method is the use of a fault response tolerance calculation tool. However, existing fault response tolerance calculation software tools are offered as a separate software package by third party vendors not associated with the vendors of the configuration software tool used to configure the controllers. Thus, the utility company personnel may need two separate computer systems, one for configuring and the other for fault response tolerance calculations.

The present invention improves both the efficiency and accuracy of configuring power switching devices in a power distribution network. The present invention provides a fault response tolerance calculation tool as part of the configuration tool used to configure the power switching devices in the power distribution network. The present invention uses software located in the user interface to calculate the fault response tolerances and display the adjusted fault response times for a given power switching device for a given set of parameters. The utility company employee is able to alter the configuration of the power switching device based on the adjusted fault responses. After altering the configuration of the power switching device, the present invention allows the utility company personnel to recalculate the fault response tolerances and confirm that the configuration settings conform to utility company guidelines. By integrating the two tools together, the present invention improves both the accuracy and efficiency of the configuration process because utility company personnel do not have to transition between two separate software tools when configuring power switching devices.

BRIEF DESCRIPTION OF THE DRAWINGS

The invention is further described in the detailed description that follows, by reference to the noted drawings by way of non-limiting illustrative embodiments of the invention, in which like reference numerals represent similar elements throughout the several views of the drawings, and wherein.

DETAILED DESCRIPTION OF ILLUSTRATIVE EMBODIMENTS

Figure 1A:
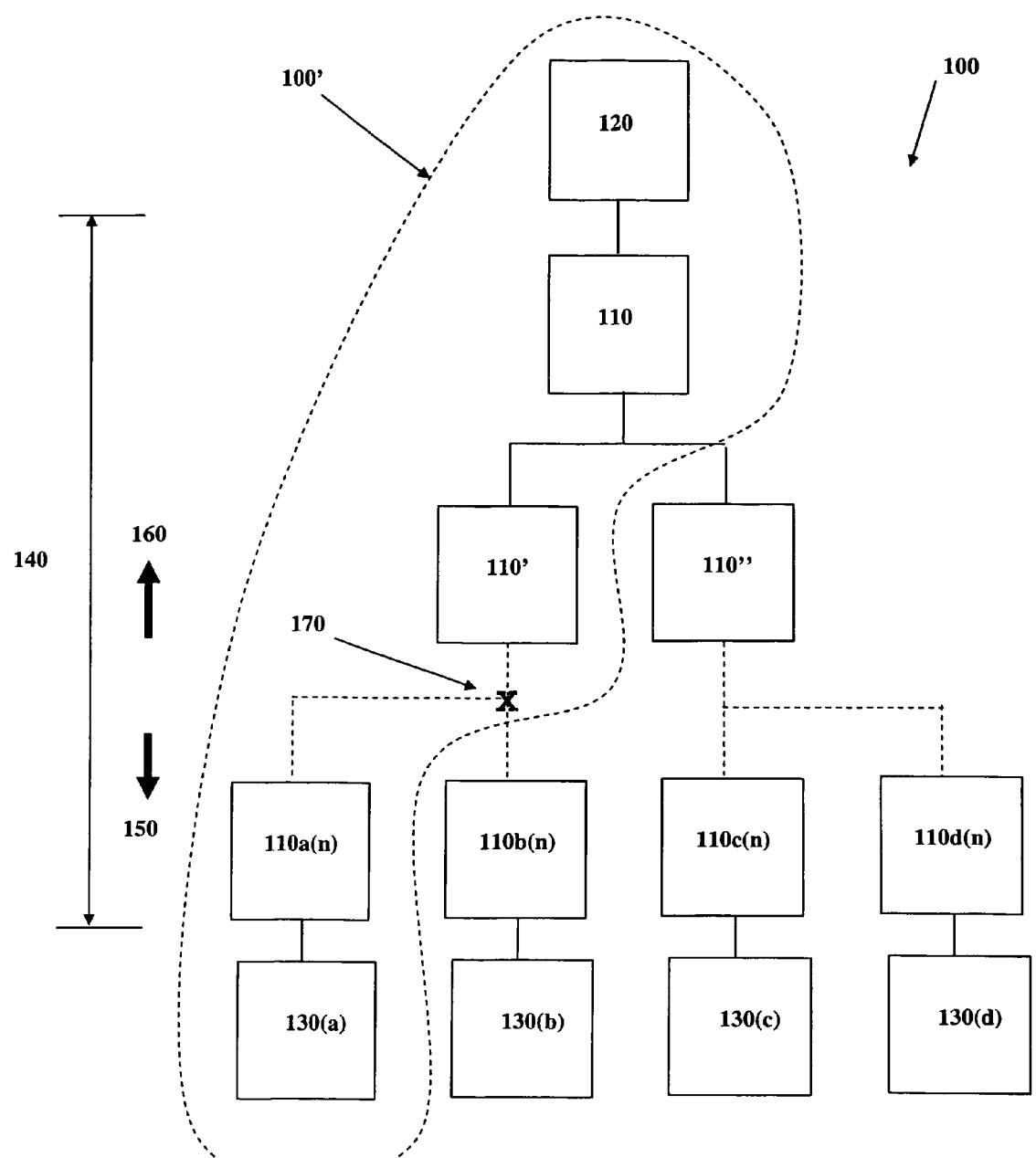
FIG. 1A illustrates a hierarchical block diagram of a power switching network.

FIG. 1A shows a hierarchical block diagram of a typical power distribution network 100. The power distribution network 100 has a first power switching device 110 connected in series between a power source 120, and power switching devices 110', 110". Power switching device 110' is connected in series to power switching devices 110a(n) and 110b(n). Power switching device 110" is connected in series to power switching devices 110c(n) and 10d(n). Power switching devices 110a(n), 110b(n), 110c(n) and 110d(n), are connected to their respective loads 130(a), 130(b), 130(c), 130 (d). The connections shown in FIG. 1A allow electricity to flow in the downstream direction 150 from the power source 120 to the loads 130(a), 130(b), 130(c), 130(d). The electrical circuit between the power source 120 and the loads 130(a), 130(b), 130(c), 130(d) is referred to as the power distribution circuit 140.

The power source 120 may be a substation that provides, for example, 15 kV-38 kV of three phase AC power. Another type of power source may be a distribution transformer connected in the distribution network 140 providing 10 kV three phase power. An individual transformer or bank of transformers connected together may comprise the loads 130(a), 130 (b), 130(c), 130(d). Thus each of the loads may be three phase transformers for large industrial applications or single phase transformers used to provide electricity to a residential consumer, or any combination thereof.

The power distribution network 100 may have multiple branches. Each branch contains a power source 120, multiple power switching devices (110, 110' . . . ) and a load (130(a), . . . ). One branch 100' is shown enclosed within the dotted line in FIG. 1A. Within branch 100' is the power source 120, power switching devices 110, 110', 110a(n), the load 130(a), as well as fault 170 located upstream 160 from power switching device 110a(n), and downstream 150 from power switching devices 110' and 110.

Figure 1B:
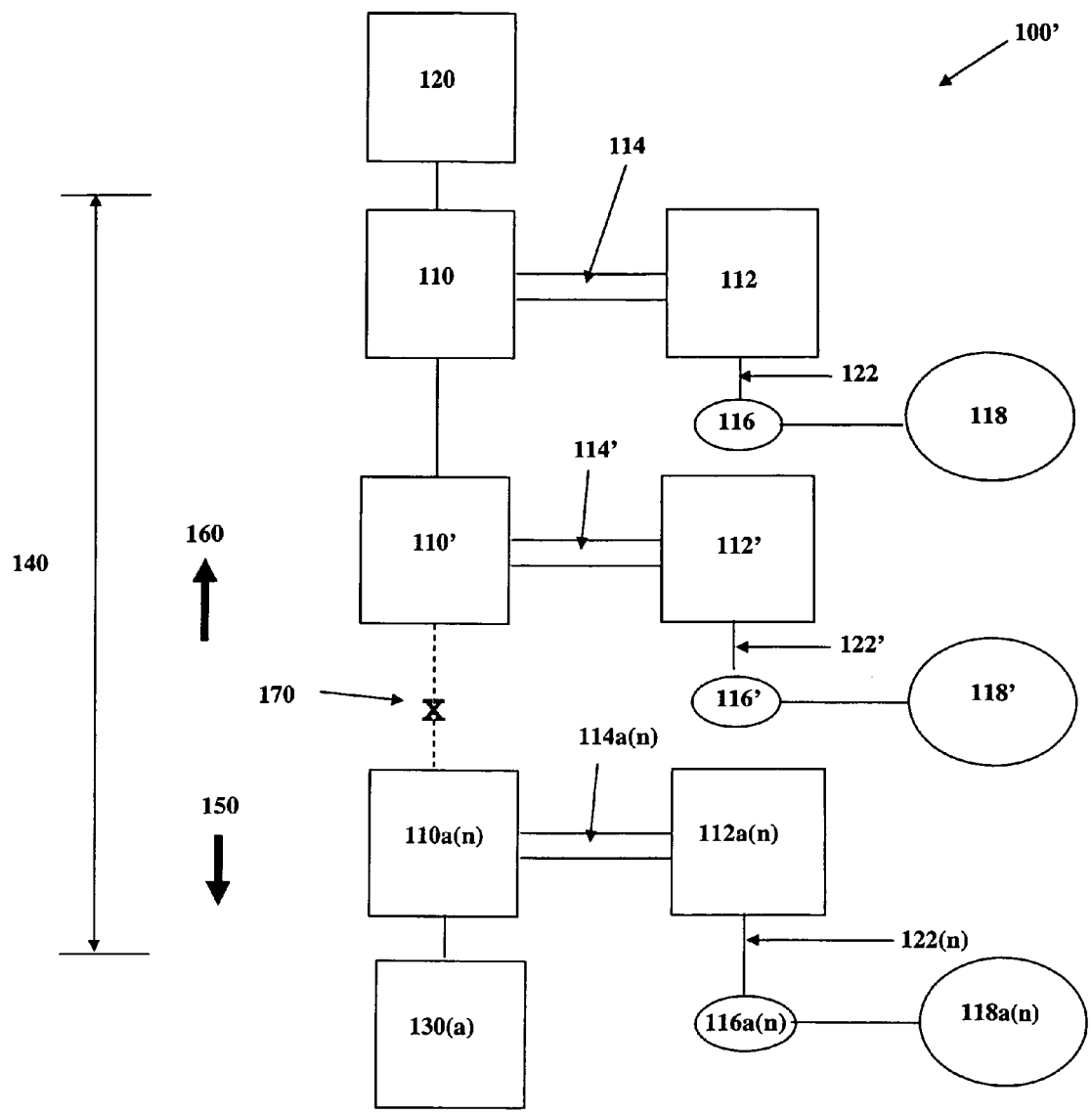
FIG. 1B illustrates a branch of power switching devices shown in FIG. 1A.

FIG. 1B displays in more detail, the branch 100' of the power distribution network 100. Within branch 100' are shown the equipment (controller, user interface, bidirectional communication bus and communication means) associated with each of the power switching devices 110, 110', and 110a(n). The equipment associated with each power switching device 110, 110', and 110a(n) is identical and therefore only the equipment associated with power switching device 110 will be described.

Power switching device 110 is connected to a controller 112 by a bidirectional communications bus 114 to thereby allow information to be exchanged between power switching device 110 and controller 112. A user 118 programs the controller 112 and receives information from the controller 112, via a user interface 116 which is connected to controller 112 through a communications means 122. The power switching device 110 is configured with information received from the controller 112 when the controller 112 is programmed. As power switching devices are added to branch 100' or any other branch in the power distribution network 140, the associated equipment (controller 112, user interface 120, bidirectional communication bus 114 and communication means 122) is also added to that branch.

The power switching device 110 transmits electrical current and voltage levels to the controllers 112 through the bidirectional communications bus 114. The controller 112 monitors and analyzes the power levels by periodically sampling the current and voltage present at the power switching device 110. When the power levels exceed preprogrammed thresholds for a predetermined period of time, the controller 112 determines that a fault condition exists. Upon making that determination, the controller 112 signals the power switching devices 110 to execute a preprogrammed response.

The fault 170 occurs either when one phase of power becomes shorted to ground, when phases become shorted to each other, or when lightning strikes the distribution circuit 140. When a fault condition occurs, large amounts of current flow through the power distribution circuit 140. As stated previously, once the controller 112 determines the fault condition exists, the controller 112 causes the power switching device 110 to execute its preprogrammed response.

Three types of power switching devices 110 that utility companies use in the power distribution circuit 140 are fault interrupters, breakers and reclosers. Each power switching device 110 performs a preprogrammed response when a fault condition in the power distribution circuit 140 is detected by the controller 112. A recloser opens and closes multiple times when a fault condition exists. By opening and closing multiple times, the recloser attempts to clear the fault 170. Should fault 170 continue to exist, the recloser clears the fault by entering a "lock out" state and remaining open until reset manually. One example of a recloser used with the present invention is the OVR-1 single phase recloser manufactured by ABB Inc. A fault interrupter opens and remains open until manually reclosed after a fault condition is detected. The breaker is similar to the recloser but only attempts to reclose once. If the fault 170 is still detected after attempting to reclose, the circuit breaker remains open. Types of controllers 112 used with the present invention are the ICD (Intelligent Controller Device), the ISD (Intelligent Switching Device), the PCD (Programmable Control Device), and the SCD (Switch Control Device) all manufactured by ABB Inc.

Clearing a fault is defined in the industry as interrupting the flow of high amounts of current through the distribution circuit 140. Thus when fault 170 is "cleared", the current path is interrupted and the high levels of current are stopped. This is to be distinguished from the removal of the fault condition. Removing the fault condition occurs when the cause of the fault is rectified (i.e. the short between two phases is removed) and normal levels of current are restored.

Those skilled in the art appreciate that overcurrent response curves are industry standards for the various power switching devices 110. Overcurrent response curves plot the predicted response time for a power switching device 110 to open versus a ratio of fault current to pick-up value. The pick-up value corresponds to a sampling threshold value of current, above which, the controller 112 starts actively monitoring for faults. The pick-up value is programmed into the controller 112 by the utility company employee when configuring the power switching device 110.

Generally, overcurrent response curves are supplied to the industry by the power switching equipment manufacturers. Other overcurrent response curves are published as industry standards by ANSI or other standards organizations. Two examples of overcurrent response curves are displayed in FIGS. 3A and 3B and are explained in detail in subsequent sections.

In practice, there are several reasons why the actual fault response time of a power switching device 110 may vary from the predicted fault response times. Precisely measuring the amount of current flowing through the power switching device 110 is very difficult and may be prone to errors due to excessive noise on the power line. The excessive noise may cause the measured value to fluctuate, and as a result, it is possible that the measured value of current may be greater than or less than the actual value of current. If there is a difference between the actual amount of current flowing and the measured amount of current flowing, the power switching device 110 may open before or after the predicted fault response time.

Another factor that may cause the actual fault response time to vary is the inherent response delay between the controller 112 detecting the fault condition and the power switching device 110 executing the preprogrammed response. There may also be a processing delay in the controller 112 during the detection of the fault condition, or delay may be encountered during the transmission of the command from the controller 112 to the power switching device 110. Mechanical movement of the internal components of the power switching device 110 may also be a potential source of delay. The present invention takes into account the various delays when calculating fault response tolerances.

Within the distribution network 140, utility companies typically require that a fault 170 clear within a predefined fault response window. For example, the response window may be in the range of 100 ms to 5 seconds, depending on various factors such as the number of power switching devices 110 in the particular branch, the loading of the branch, the levels of power switching devices, any backup fuse protection and so forth. Fault conditions causing high amounts of current flowing from the power source 120 to the loads 130 for extended periods of time will damage the transmission systems, transformers and possibly customer equipment. To ensure that high levels of current are not allowed to flow uncontrolled, the utility company provides configuration guidelines to assist the utility employee in programming the controllers 112, 112', 112a(n).

Utility company personnel program the controllers 112, 112', 112a(n) located at different levels of the distribution network 140 with different predetermined fault thresholds. The fault threshold is directly related to the amount of current allowed to flow through the associated power switching device 110 for a given amount of time before a fault condition is declared. For example, controller 112a(n) is programmed with a lower fault thresholds than controller 112' to thereby respond to the fault 170 before controller 112'. This allows the downstream 150 controller 112(a)n closest to the fault 170 to open its respective power switching device 110a(n), before the next upstream 160 controller 112' opens power switching device 110'. Further, the next upstream 160 controller 112 is configured with a higher fault threshold than controller 112'. Thus, if opening power switching device 110a(n) or 110' does not clear the fault 170, power switching device 110 will open next. One way to lower the fault threshold is to lower the pick-up value programmed into the controller 112. As is explained in subsequent sections, lowering the pick-up value causes the controller 112 to react faster to the fault condition.

As an illustrative example, when a fault 170 of 400 A is detected for the first time in branch 100', the utility company requires that the fault 170 clear within 250 ms from detection. In this example, the power switching devices are OVR-1 reclosers and the utility company requires that overcurrent protection curve A 300 (FIG. 3A) is to be used to calculate the fault responses. Using the present invention, the minimum and maximum fault response times for power switching device 110a(n) for a pick-up current of 100 A are calculated as 22 ms and 71 ms, respectively (these fault response times are shown at 264 of the curve tolerance calculator screen 250 in FIG. 2B and are explained in subsequent sections). The fault response times for next upstream 160 power switching device 110', are calculated by the present invention as 98 ms and 139 ms respectively, for a pick-up current of 250 A (these fault response times are shown at 264' of the curve tolerance calculator screen 250' in FIG. 2C and are explained in subsequent sections). For power switching device 110, a pick up value of 350 A is used and the minimum and maximum fault response times are calculated by the present invention as 150 ms and 227 ms respectively. In this example, the greatest fault response time is 227 ms (power switching device 110) and is within the 250 ms maximum fault response requirement. Additionally, the staggered fault response times do not overlap and each controller 112, 112', 112a(n) has sufficient time to open its respective power switching device 110, 110', 110a(n) when a fault condition is detected.

When configuring the power switching devices 110, 110', 110a(n) it is important that a sufficient fault response tolerance is allocated. If too low a tolerance or no tolerance is used, the controller 112 may determine that a fault condition exists and open power switching device 110, before allowing any of the downstream controllers 112', 112a(n) to react. This causes a larger service outage than would normally occur if the controllers 112, 112', 112a(n) were configured with sufficient fault response tolerances. Referring back to the previous example, if no tolerances were allocated, and the same parameters used (400 A fault current, overcurrent protection Curve A and pick-up current of 100 A) the predicted fault response time of power switching device 110a(n) is calculated by the present invention as 30 ms. If power switching device 110' is configured with a pick-up current of 175 A and using the same fault current, and overcurrent protection curve, the predicted response time, calculated by the present invention, is 58 ms. In this configuration, no fault tolerances have been allocated for power switching device 110'. Those skilled in the art appreciate that any fault response delay experienced by power switching device 110a(n) may keep it from clearing until roughly 71 ms from the initial fault condition (this is the value displayed at 264 in FIG. 2B). With power switching device 110' configured to open at 58 ms, power switching device 110' may clear before power switching device 110a(n) clears.

Conversely, if the tolerances are too high, the number of power switching devices 110, 110', 110a(n) configured in distribution circuit 140 may be improperly constrained. For example, the utility company configures power switching device 110a(n) to have a predicted response time of 30 ms and allocates an additional 100 ms fault response tolerance for a maximum response time of 130 ms. The utility company would then only have 120 ms left of the 250 ms fault response window to configure any remaining power switching devices (110', 110).

The present invention improves the accuracy and efficiency of calculating fault response tolerances for power switching devices 110, 110', 110a(n). The present invention calculates the different fault response tolerances for each overcurrent response curve and displays to the user 118 the adjusted fault responses. The results are displayed to the user 118 while he or she is configuring the power switching device 110. This integrated process allows the user 118 to see how the power switching device 110 responds to different fault currents and pick-up currents for each overcurrent response curve during the configuration process. The present invention provides automation and integration of the manual calculation process and allows utility company personnel to configure power switching devices 110, 110', 110a(n) faster and more accurately.

The process of configuring a power switching device by programming its associated controller will now be described using power switching device 110 and its associated equipment (controller 112, user interface 120, bidirectional communication bus 114 and communication means 122) as the illustrative example. The same configuration process is applied to all of the other power switching devices 110', 110 and their associated equipment (controller, user interface, bidirectional communication bus and communication means). In the configuration process, the user 118 configures the power switching device 110 by programming the controller 112. The first step in the configuration process occurs when the user 118 connects to the user interface 116. Next, the user 118 establishes a connection to the controller 112 through the communication means 122. Once the connection is established, the user interface 116 displays a GUI (graphical user interface) to assist the user 118 in programming the controller 112. The user 118 enters configuration information into the GUI and the user interface 116 uses this information to program the controller 112. The configuration process is further described in the flow chart 400 of FIG. 4 and discussed in detail in subsequent sections.

In one embodiment of the present invention, the user interface 116 is a PC (desktop or laptop) running Windows™ Operating System with an associated application software package such as WinICD or AFSuite™, offered by ABB Inc. The user interface 116 allows the controller 112 to send information to, or receive information from the user 118. Examples of information passed to the user 118 from the controller 112 are the number of times a fault was detected in the power distribution circuit 140, the type of fault, and the present status of the power switching device 110. The user 118 uses the user interface 116 to program the controller 112 with information such as fault thresholds, type of power switching device, and the preprogrammed response the power switching device 110 is to perform in response to the detection of the fault 170.

A user 118 may be the utility craftsperson who is at the power switching device location. The craftsperson can use a laptop PC as the user interface 116 and connect directly to a serial port on the controller 112. The connection to the serial port is the communication means 122. Another user 118 may be the utility maintenance person remotely logged into the controller 112. The remotely located utility maintenance person may use a desktop PC for the user interface 116 and a modem as the communication means 122 to connect to the controller 112.

Figure 2A:
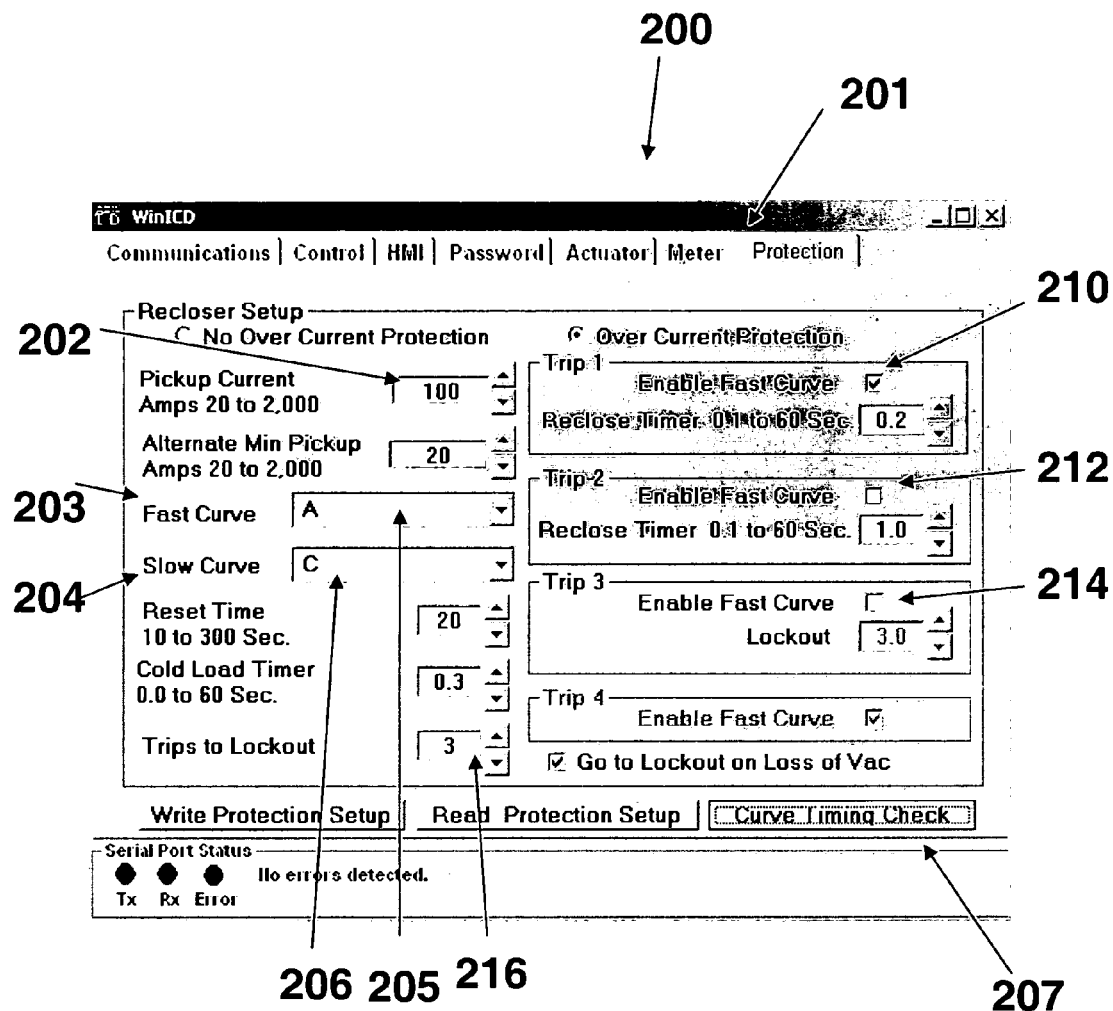
FIG. 2A shows an illustrative screen shot of a power switching device protection configuration screen.

FIG. 2A shows a screen shot of a protection configuration screen 200 GUI associated with one embodiment of the present invention used to configure the power switching device 110 when that device is an OVR-1 recloser. The protection configuration screen 200 assists the user 118 in programming the fault thresholds for the power switching device 110 and is displayed after the user 118 has logged into the user interface 116 through the communication means 122 and has selected the protection tab 201. In the protection configuration screen 200, the user selects the pickup current 202. The pickup current 202 is the threshold that triggers the controller 112 to start collecting potential fault information. The controller 112 determines that a fault condition exists when the overcurrent reaches a predetermined level above the pickup current 202 for a set duration of time.

As is common in the industry, two different overcurrent response curves are used by the controller 112 to respond to fault conditions. In the embodiment shown in FIG. 2A, the two overcurrent response curves are the fast curve 203 and the slow curve 204. The user 118 selects a particular overcurrent response curve from a predetermined set of overcurrent response curves to be used for the fast curve 203, and the slow curve 204 using the drop menus 205 and 206 respectively. In WinICD there are approximately 20 different overcurrent response curves to choose from. In the AFSuite operating software, there are approximately 70 overcurrent response curves that may be selected. The user 118 can choose any of these overcurrent response curves for the fast curve 203 and the slow curve 204. If desired, the user can select the same overcurrent response curve for both the fast curve 203 and the slow curve 204.

In FIG. 2A, the user has selected Curve A 300 (see FIG. 3A) as the fast curve 203 and Curve C 350 (see FIG. 3B) as the slow curve 204. The user 118 also selects whether or not to enable the fast curve 203 for initial fault response by checking the box located at 210. If box 210 is checked, the controller uses the fast curve for fault response the first time a fault condition is detected. If box 210 is not checked, the controller defaults to the slow curve for initial fault response. Similarly, if box 212 is checked, the controller uses the fast curve 203 for fault analysis when the second fault condition is detected. If the box 212 is not checked, the controller defaults to the slow curve 204 for fault response. If box 214 is checked the user selects to use the fast curve 203 for the fault response of the third fault condition. Otherwise the slow curve 204 is used by default.

Figure 2B:
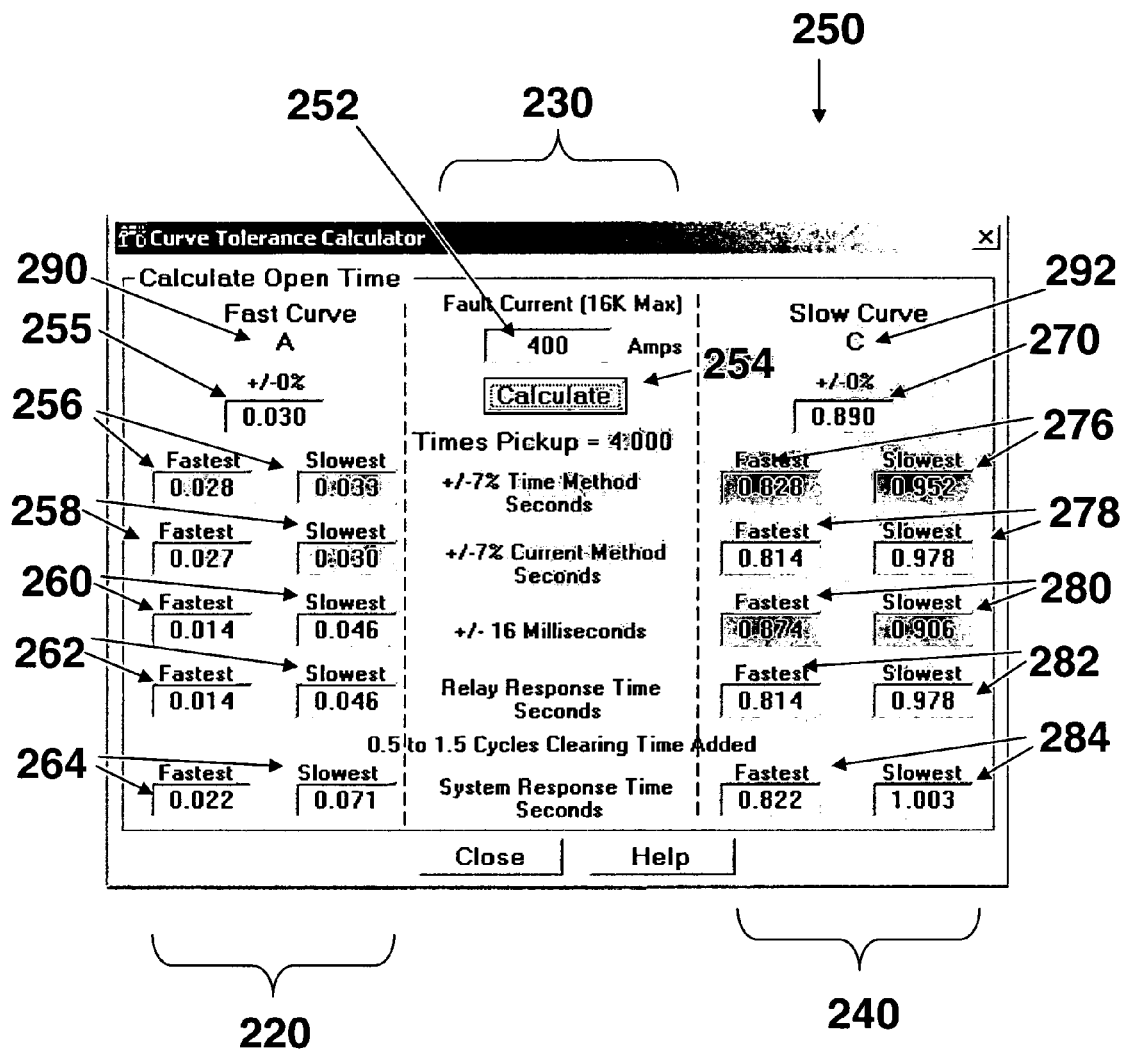
FIG. 2B shows an illustrative screen shot of a power switching device curve tolerance calculator screen.

The user 118 clicks on the curve timing check button 207 to initiate the fault response tolerance calculations and display the results. After the user has clicked on the curve timing check button 207, the curve tolerance calculator screen 250 (See FIG. 2B) is displayed. The curve tolerance calculator software is part of the user interface software package. All of the adjusted response times 256, 258, 260, 262, 264, 276, 278, 280, 282, 284 and predicted response times 255, 270 shown in the curve tolerance calculator screen 250 are displayed in seconds. In the curve tolerance calculator screen 250, the user 118 enters a fault current 252. In the embodiment of FIG. 2B, a value of 400 A is entered. The fault current 252 is used to calculate the response times displayed in columns 220 and 240, and is used to determine current as a percentage of minimum trip. Current as a percentage of minimum trip is calculated by the following equation:

$$\text{Current as a percentage of minimum trip} = \frac{\text{fault current}(252)}{\text{pick-up current}(202)} \times 100\%$$

Figure 3A:
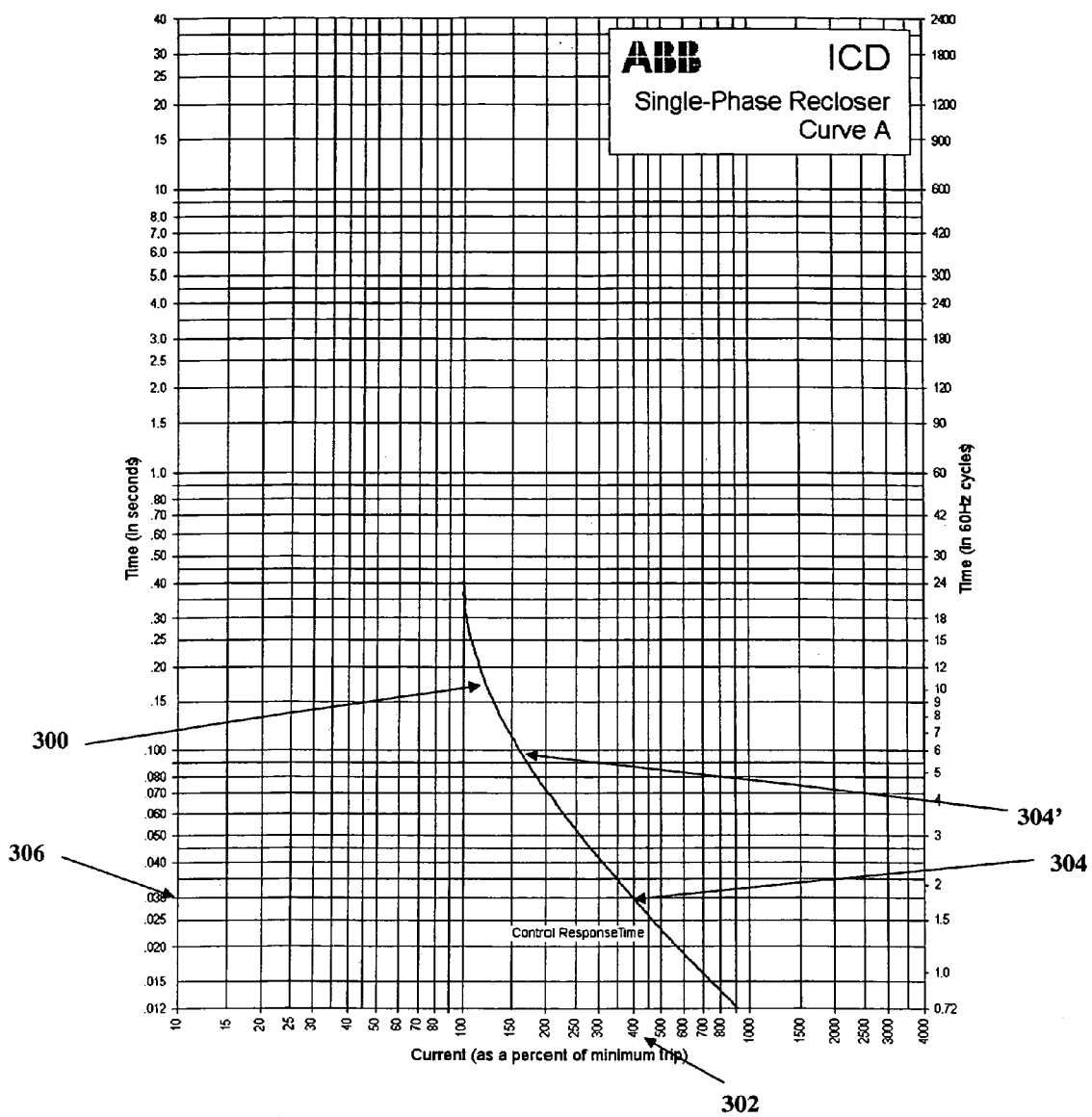
FIG. 3A illustrates an overcurrent response curve for a single phase recloser.
Figure 3B:
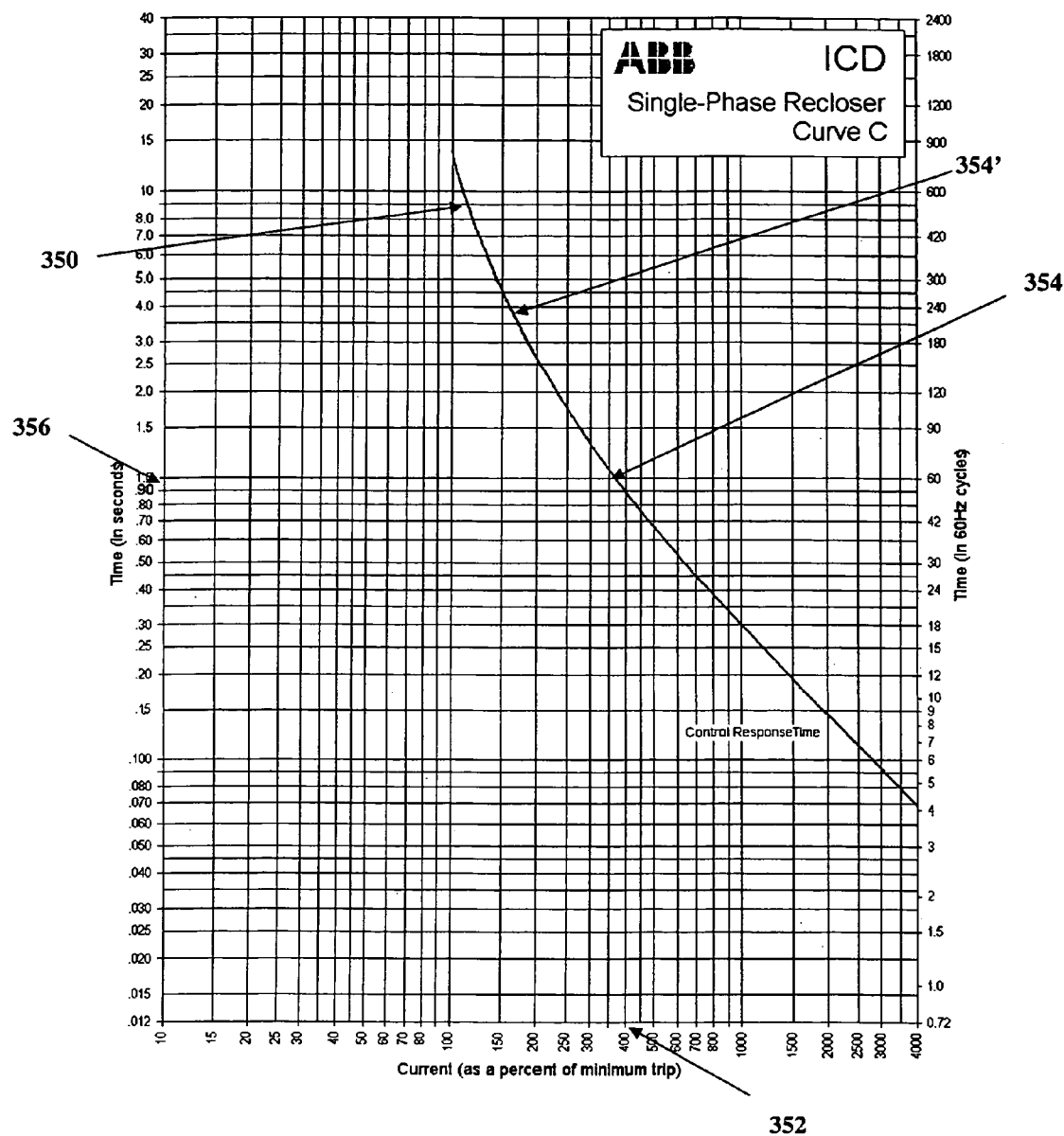
FIG. 3B illustrates another overcurrent response curve for a single phase recloser.

Current as a percentage of minimum trip is the X axis of curves 203, 204 and the predicted response time of the power switching device is the Y-axis of those overcurrent response curves 203, 204. Fast curve A 300, selected in window 203, is shown in FIG. 3A and slow curve C 350 selected in window 204 is shown in FIG. 3B. FIGS. 3A and 3B are described in more detail below.

After the fault current 252 is entered, the user 118 clicks on the calculate button 254. The user interface software then calculates the predicted response times based on current as a percentage of minimum trip as plotted for each of the overcurrent response curves 203, 204. For the present example in which the user has selected 400 A as the fault current, and as is shown in window 202 of FIG. 2A, the pick-up current is 100 A, the current as a percentage of minimum trip is 400%.

Once the predicted response times have been calculated, they are displayed for each overcurrent response curve 203, 204 at 255 and 270. The user interface software also calculates a range of adjusted fault responses associated with the fault current 252. The adjusted fault responses are the predicted fault response time with a fault response tolerance added or subtracted to provide an adjusted fault response. The adjusted fault responses are displayed in the associated column 220, 240 for each overcurrent response curve 203, 204.

In order to calculate the predicted fault responses, each overcurrent response curve 203, 204 must be converted into a digital representation and stored in an associated look-up table. These look-up tables are preprogrammed in the user interface memory by the user interface manufacturer. The look-up tables contain the data points for each overcurrent response curve. Typically, each overcurrent response curve contains thousands of data points stored in the user interface software look up tables. The user interface software accesses the look-up tables and computes the predicted response times and the adjusted fault response associated with each overcurrent response curve. This calculation is based on the fault current 252 as a percentage of minimum trip.

The fault response tolerance criteria are displayed in column 230, between the fast curve column 220 and the slow curve column 240. As displayed at 290, the fast curve 203 has been set to Curve A 300 (FIG. 3A), and at 292 the slow curve 204 has been set to Curve C 350 (FIG. 3B). For each fault response tolerance criteria shown in column 230, the user interface software calculates and displays the adjusted fault response times for the fault current 252 for each overcurrent response curve 203, 204. In the embodiment of FIG. 2B, there are three different fault response tolerance criteria, +/−7% time, +/−7% of current and +/−16 ms. The fault response tolerance criteria have been chosen by the user interface manufacturer to provide the best coverage of fault response tolerances for typical power switching devices 110. The ranges for the adjusted fault response times are displayed as fastest and slowest under each curve column 220, 240.

The first fault response tolerance criterion is displayed in column 230 as +/−7% Time. The user interface software uses the predicted response time 255, 270 and multiplies the values by 0.93 and 1.07. The results are displayed at 256, and at 276 respectively. The next fault response tolerance criterion in column 230 is +/−7% of fault current 252. The fault current 252 is multiplied by 0.93 and 1.07 and the adjusted response time associated with the adjusted fault current value (as a percentage of minimum trip) is calculated and displayed at 258 and 278 respectively. In the illustrative example, 400 A is multiplied by 0.93 and 1.07 by the curve tolerance calculator software. The results (372 A and 428 A) are fed back into the equation shown above to determine current as a percentage of minimum trip. Once the value of current as a percentage of minimum trip has been calculated, the user interface software program accesses the look-up tables associated with each curve 203, 204. The adjusted fault responses displayed at 258 and 278 are the predicted response times for the adjusted current values (372 A and 428 A) for each overcurrent response curves 203, 204.

The last criterion shown in column 230 is +/−16 ms of the predicted response time. This calculation adds and subtracts 16 ms to the predicted response times 255, 270, and displays the results at 260 and 280, respectively. The value of 16 ms is used because it is roughly the period of an AC cycle at 60 Hz.

Once the adjusted fault responses to the three fault tolerance criteria are calculated, the user interface software determines the criterion with the largest range and displays those values at the Relay Response Time for each curve. In the present example, these displays are shown at 262 for the fast curve and at 282 for the slow curve.

In the present invention, a final calculation is performed by the user interface software. The final calculation adds a first factor (in ms) to the fastest fault response tolerances displayed for each overcurrent response curve in column 220 and 240 and adds a second factor (in ms) to the slowest fault response tolerances displayed columns 220 and 240. The final calculation takes into account any mechanical or other dependencies of the power switching devices 110, 110', 110a(n). In the present invention, the first factor is determined to be 8 ms (roughly ½ AC Cycle at 60 Hz). For the second factor a value of 25 ms (roughly 1½ AC Cycles at 60 Hz) is used. The power switching device manufacturer may determine that these factors are necessary due to any additional mechanical movement or other possible causes of delay for the power switching device 110. The power switching device manufacturer may also modify the first and second factors depending on the particular power switching device 110 being configured. The values at 262 and 282 are adjusted by the first and second factors and the results are displayed at 264 and at 284, respectively. The adjusted fault responses displayed at 264 and 284 are the minimum and maximum fault responses recommended for utility company personnel to use in configuring cascading power switching devices 110, 110', 110a(n).

The calculation of the predicted response times using the present invention can be verified by visually inspecting each of the overcurrent response curves 300, 350 shown in FIGS. 3A and 3B. As is shown in FIGS. 3A and 3B overcurrent response curve A 300 and curve C 350 are plotted logarithmically as current (as a percent of minimum trip) versus response time (in seconds). The value of current as a percentage of minimum trip in the illustrative example (FIG. 2B) is 400%. This value is shown on the graph of FIG. 3A at point 302 and intersects the curve 300 at point 304. The corresponding response time is shown on the curve at 306, which corresponds to the value shown at 255 of FIG. 2B. To verify the calculations for the slow curve 204, the same process is followed. Referring to FIG. 3B, the value of current as a percentage of minimum trip is 400% as shown at 352. This value intersects the curve 350 at point 354. The corresponding response time is then identified at point 356, which is the same value displayed at 270 in FIG. 2B. In an alternative embodiment, the adjusted fault responses may be displayed as textual information such as a spread sheet or a table listing the adjusted fault responses.

Figure 2C:
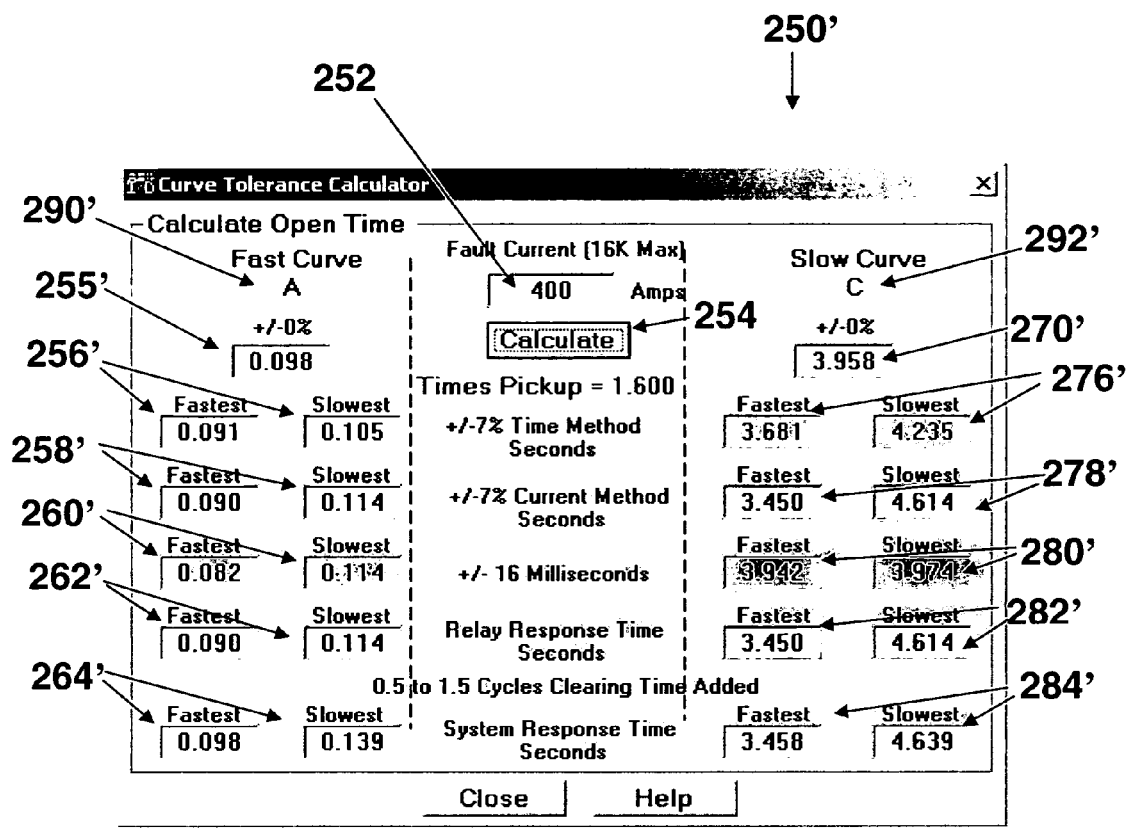
FIG. 2C shows another illustrative screen shot of a power switching device curve tolerance calculator screen.

In a second illustrative example, the pick up current 202 is 250 A (decreasing the sensitivity to fault conditions) and the fault current 252 remains at 400 A. Thus the value of current as a percentage of minimum trip is 160%. FIG. 2C shows a curve tolerance calculator screen 250' displaying the predicted responses 255', 270' and adjusted fault responses 256', 258', 260', 262', 264', 276', 278', 280', 282', 284' calculated for these parameters (fault current, overprotection curve and pick-up current). As displayed at 290' in FIG. 2C, Curve A 300 is used for the fast curve 203, and 292' Curve C 350 is used for the slow curve 204. As is shown in FIG. 2C, decreasing the fault sensitivity of the controller 112 results in an increase in the predicted response times 255' and 270' when compared to the predicted response times 255 and 270 of FIG. 2B. These values can also be verified at point 304' in FIG. 3A and point 354' in FIG. 3B.

Figure 4:
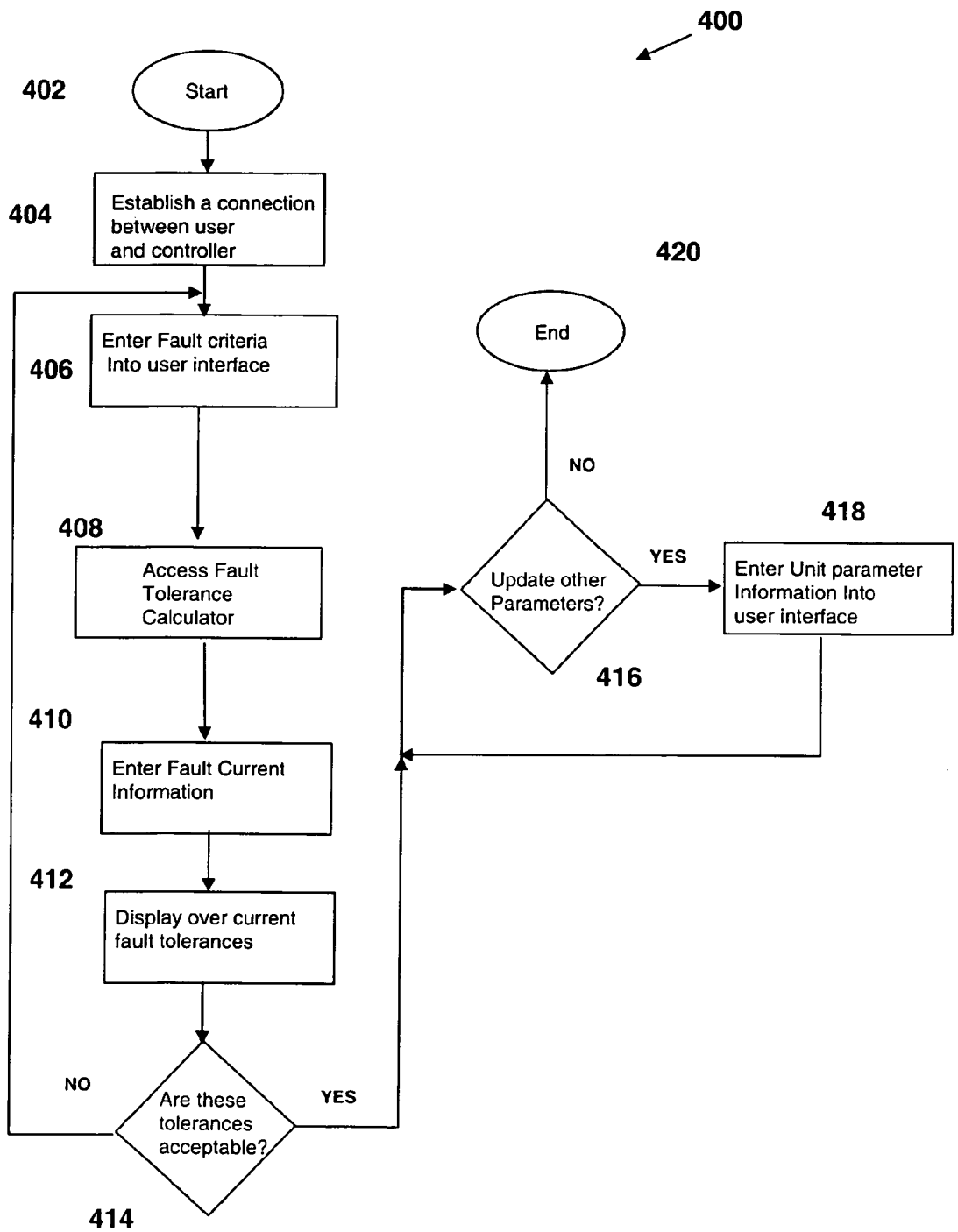
FIG. 4 is an illustrative flow chart showing the software process used by the user interface of the controller.

FIG. 4 is an illustrative flow chart 400 showing the steps that are performed for the integrated fault response tolerance calculator and configuration tool in accordance with the present invention. The flow begins at block 402. At block 404 the user 118 uses the user interface 116 to establish a connection with the controller 112 of the power switching device 110 being configured. Once the connection is established the protection configuration screen 200 of FIG. 2A is displayed. At block 406, the user 118 enters the pickup current 202 in the appropriate location in the protection configuration screen 200. After the pickup current 202 is entered, the user 118 accesses the fault tolerance calculator at block 408, and the curve tolerance calculator screen 250 is displayed.

The fault current 252 is entered into the curve tolerance calculator screen 250 as shown at block 410. At block 412 the user 118 then clicks on the calculate tab 254 and the fault response tolerances are calculated and the adjusted fault responses are displayed. The user 118 then decides at block 414 if the adjusted fault responses are within the utility guidelines. If the adjusted fault responses are not within utility guidelines, the user 118 goes back to block 406 and changes the pickup current 202 and re-executes the fault response tolerance calculation sequence (steps 408-414). If the user 118 accepts the fault response tolerance calculations, the user is then directed to decision block 416.

At decision block 416, the user 118 chooses whether to update other parameters in the controller 112. The user 118 may decide to change the parameters based on the calculated results of the adjusted fault responses. For example, the user 118 may decide, per utility guidelines, to enable (or disable) the slow curve for the third instance a fault is detected by selecting (or unselecting) box 214 in FIG. 2A. If the user 118 chooses to update other parameters, the user 118 enters this information at block 418. From block 418, the user 118 is directed back to decision block 416. If no further parameters are to be updated, the flow ends at block 420.

As will be appreciated by one skilled in the art, the present invention may take the form of a computer readable media containing computer code instructing a processor within a user interface. The computer readable media may instruct the processor to receive configuration information for a power switching device and, calculate adjusted fault responses for the power switching device from the configuration information.

It is to be understood that the foregoing description has been provided merely for the purpose of explanation and is in no way to be construed as limiting of the invention. Where the invention has been described with reference to embodiments, it is understood that the words which have been used herein are words of description and illustration, rather than words of limitation. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A configuration tool for configuring a power switching device including a controller, the configuration tool comprising:
   a user interface including a configuration means and a fault response calculator, said user interface communicating with said controller,
   said configuration means providing configuration information for said power switching device to said fault response tolerance calculator, said configuration information including pick-up current and overcurrent response curves, said fault response tolerance calculator computing fault response tolerances for the power switching device for a fault current from said configuration information, said fault response tolerances including at least one response time range for said power switching device at said fault current wherein said user interface transmits to the controller, the response the power switching device is to perform in response to the detection of a fault.

2. The configuration tool of claim 1 wherein the adjusted fault responses are displayed by said user interface.

3. The configuration tool of claim 2 wherein said user interface comprises a Graphical User Interface (GUI) for displaying said adjusted fault responses.

4. The configuration tool of claim 2 wherein a recommended fault response tolerance is displayed by said user interface.

5. The configuration tool of claim 1 wherein said user interface is hosted on a PC based platform.

* * * * *